United States Patent [19]

Hayakawa et al.

[11] 4,440,025
[45] Apr. 3, 1984

[54] ARC SCAN TRANSDUCER ARRAY HAVING A DIVERGING LENS

[75] Inventors: Yoshihiro Hayakawa, Sagamihara; Tsutomu Yano; Ryobun Tachita, both of Kawasaki; Hiroshi Fukukita, Tokyo; Kazuyoshi Irioka, Sagamihara; Akira Fukumoto, Machida, all of Japan

[73] Assignee: Matsushita Electric Industrial Company, Limited, Osaka, Japan

[21] Appl. No.: 277,816

[22] Filed: Jun. 26, 1981

[30] Foreign Application Priority Data

Jun. 27, 1980 [JP] Japan .................................. 55-88129

[51] Int. Cl.$^3$ ............................................ G01N 29/00
[52] U.S. Cl. ........................................ 73/642; 73/626; 73/644; 367/150; 128/660
[58] Field of Search ............................ 73/642, 644, 626; 128/660; 367/150; 310/335

[56] References Cited

U.S. PATENT DOCUMENTS

| | | |
|---|---|---|
| 2,300,251 | 10/1942 | Flint . |
| 2,420,676 | 5/1947 | Peterson . |
| 3,168,659 | 2/1965 | Bayre et al. ...................... 73/642 X |
| 3,587,561 | 6/1971 | Ziedonis . |
| 3,922,907 | 12/1975 | Hurwitz et al. ........................ 73/642 |
| 3,927,662 | 12/1975 | Ziedonis ........................... 73/642 X |
| 3,958,559 | 5/1976 | Glenn et al. ........................ 73/642 X |
| 3,971,962 | 7/1976 | Green . |
| 3,982,223 | 9/1976 | Green . |
| 4,156,863 | 5/1979 | Madison et al. . |
| 4,168,482 | 9/1979 | Sternberg ............................ 367/150 |
| 4,183,249 | 1/1980 | Anderson . |
| 4,205,686 | 6/1980 | Harris et al. . |
| 4,211,948 | 7/1980 | Smith et al. ....................... 73/644 X |
| 4,211,949 | 7/1980 | Briskew et al. ................... 73/642 X |
| 4,217,516 | 8/1980 | Iinuma et al. ......................... 73/642 |
| 4,242,912 | 1/1981 | Burckhardt et al. ............. 73/642 X |
| 4,297,607 | 10/1981 | Lynnworth et al. ............. 73/642 X |
| 4,325,381 | 4/1982 | Glenn .................................. 128/660 |
| 4,340,944 | 7/1982 | Dory .................................. 73/642 X |
| 4,344,327 | 8/1982 | Yoshikawa et al. ................. 73/626 |

FOREIGN PATENT DOCUMENTS

| | | |
|---|---|---|
| 2345697 | 9/1973 | Fed. Rep. of Germany . |
| 2718772 | 11/1977 | Fed. Rep. of Germany . |
| 56-46390 | 4/1981 | Japan . |

OTHER PUBLICATIONS

"Intra Operative Real Time Echocardiotomography by a Newly Developed 'Convex' Shape Transducer"—S. Suzuki et al., Jul. 22-27, 1979; Second Meeting of WFUMB, The Fourth World Congress on Ultrasonics in Medicine; pp. 165, 166 and 170.

*Primary Examiner*—Howard A. Birmiel
*Attorney, Agent, or Firm*—Lowe, King, Price & Becker

[57] ABSTRACT

An ultrasonic transducer array for arc scan imaging systems comprises a plurality of elongated piezoelectric transducers arranged successively to define a convexed energy radiating surface. A plano-concave acoustic diverging lens is attached to the convexed surface to diverge the acoustic energy transmitted from the transducers in an increased steering angle. The transducers are assembled on an impedance matching layer which defines the convexed radiating surface. The acoustic impedance of the diverging lens is substantially equal to the acoustic impedance of the human body, while the acoustic impedance of the impedance matching layer is greater than that of the human body.

14 Claims, 6 Drawing Figures

ARC SCAN TRANSDUCER ARRAY HAVING A DIVERGING LENS

BACKGROUND OF THE INVENTION

The present invention relates to a piezoelectric transducer array for use in an ultrasonic imaging system particularly for medical diagnostic applications, and in particular to an arc scan type piezoelectric transducer array.

Ultrasonic transducer arrays are broadly classified under the categories of linear scan type and sector scan type. Conventional linear scan type arrays comprise piezoelectric transducers, 256 in number, which are successively linearly arranged side by side. A group of 16 transducers is selectively activated by delayed burst pulses generated by a commonly shared transmit circuitry so that a focused ultrasonic beam is transmitted. The selected group is successively shifted to the next by one transducer element to shift the beam linearly to the next, so that the ultrasonic energy is scanned in a rectangular format. Advantages of the liner scan imaging system are that it can hold the device size to a minimum due to the common sharing of transmit and receive circuitry among the transducers and that it can provide detailed near-field tomographic information. However, the linear scan system has a disadvantage in that it is incapable of scanning areas behind ribs and in that the transducer array is relatively bulky for manipulation.

Conventional transducer arrays of the sector scan type, on the other hand, usually comprise 32 transducer elements each of which is associated with its own transmit and receive circuitry. The transmit circuitry steers the ultrasonic beam in a sector format by applying successively delayed burst pulses to the transducers. Although the sector scan system is capable of obtaining tomographic information from behind ribs, the control circuitry is expensive due to the large number of circuit elements associated with the transducers and the near-field image is not satisfactory for diagnostic purposes.

SUMMARY OF THE INVENTION

An object of the present invention is therefore to provide a piezoelectric transducer array which combines the advantages of the linear and sector scan type transducer arrays.

This object is achieved by forming an array of piezoelectric transducers on a frame structure which is convexed in the direction of propagation of ultrasonic energy. The number of transducers is greater than the conventional sector scan type array but smaller than the conventional linear scan type array. A plano-concave acoustic lens is attached to the curved transducer array so that a plane entry surface is defined with a human subject. The acoustic lens is formed of a material having substantially the same acoustic impedance as that of the human body but having a characteristic so that the acoustic energy travels in the lens at a speed lower than it travels in the human body. The acoustic lens thus serves to diverge the transmitted ultrasonic energy to thereby successfully scan behind-the-rib areas hitherto inaccessible to by conventional linear scan imaging systems, while retaining its advantage in near-field details. The transducer array is driven by a steering circuit which incorporates the advantages of the linear scan type steering circuit by activating a successively selected group of transducers.

Preferably, the transducers are assembled on an impedance matching layer having a higher acoustic impedance than the acoustic impedance of the diverging lens. The impedance matching layer is attached to the diverging lens to transmit the acoustic energy with a minimum of loss to the human body.

BRIEF DESCRIPTION OF THE DRAWINGS

The invention will be further described in detail with reference to the accompanying drawings, in which.

DETAILED DESCRIPTION

Figure 1:
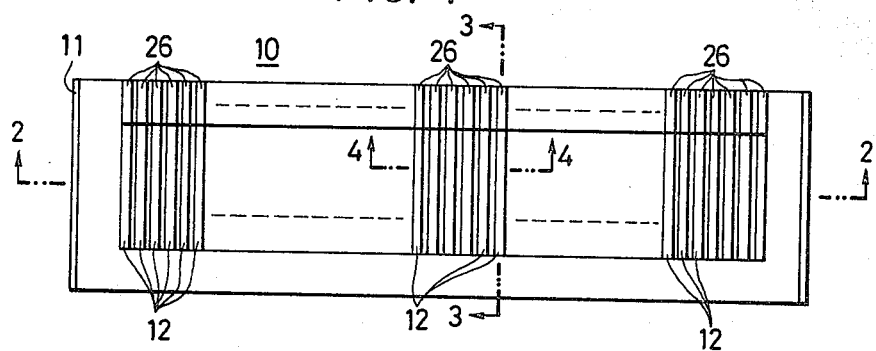
FIG. 1 is an illustration of a top plan view of an ultrasonic transducer array embodying the invention.
Figure 2:
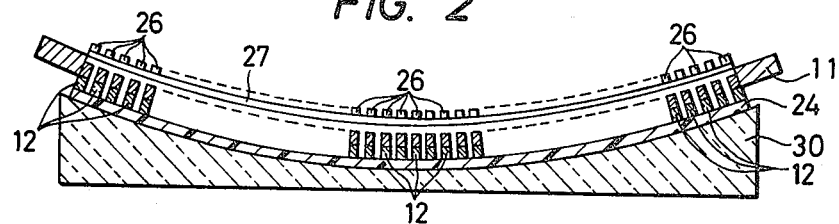
FIG. 2 is an illustration of a cross-sectional view taken along the lines 2—2 of FIG. 1.
Figure 3:
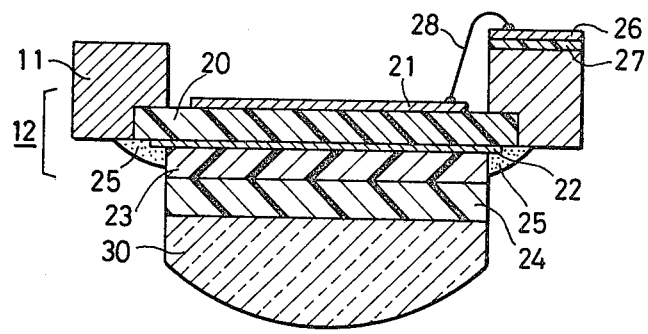
FIG. 3 is an illustration of a cross-sectional view taken along the lines 3—3 of FIG. 1.
Figure 4:
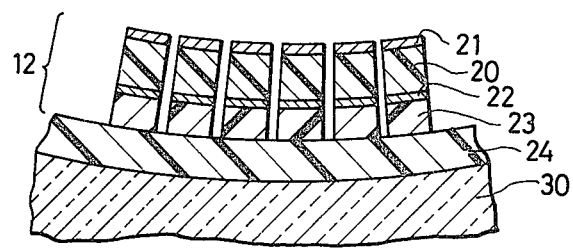
FIG. 4 is an illustration of a cross-sectional view taken along the lines 4—4 of FIG. 1.

An array of piezoelectric transducers embodying the present invention is generally indicated at 10 in FIG. 1. The transducer array 10 comprises a conductive frame 11 which is convexed in the direction of propagation of ultrasonic energy. A plurality of elongated piezoelectric transducers 12 is successively arranged on the convexed frame structure 11 as seen from FIG. 2. As illustrated in detail in FIGS. 3 and 4, each transducer 12 comprises a piezoelectric element 20 which extends transverse to the frame 11 to bridge its parallel side members and connected thereto by a suitable adhesive material. On the upper and lower side faces of the piezoelectric element 20 are electrodes 21 and 22, respectively. The lower electrodes 22 are electrically connected to the side members of the frame 11 by conductive adhesive 25 so that the frame 11 serves as a common electrode of the transducer array 10. In a preferred embodiment, each piezoelectric element 20 is so dimensioned that its width-to-thickness ratio imparts a transverse expansion vibrational mode to the array 10. With this vibrational mode a high sensitivity and excellent bandwidth characteristics are obtained. In a further preferred embodiment, each transducer 12 includes a first impedance matching element 23 which is attached to the lower electrode 22. The transducers 12 are secured to a second, or common impedance matching layer 24 which extends along the length of the frame 11 in contact with the first impedance matching elements 23. Suitable material for the first impedance matching elements 23 is rock crystal, glass or fused quartz and suitable material for the second impedance matching layer 24 is epoxy resin. The acoustic impedance of the first impedance matching elements 23 is preferably 2.5 to 9.5 times greater than the acoustic impedance of the human body and the acoustic impedance values of the common impedance matching layer 24 is preferably 1.6 to 2.7 times greater than that of the human body.

Figure 5:
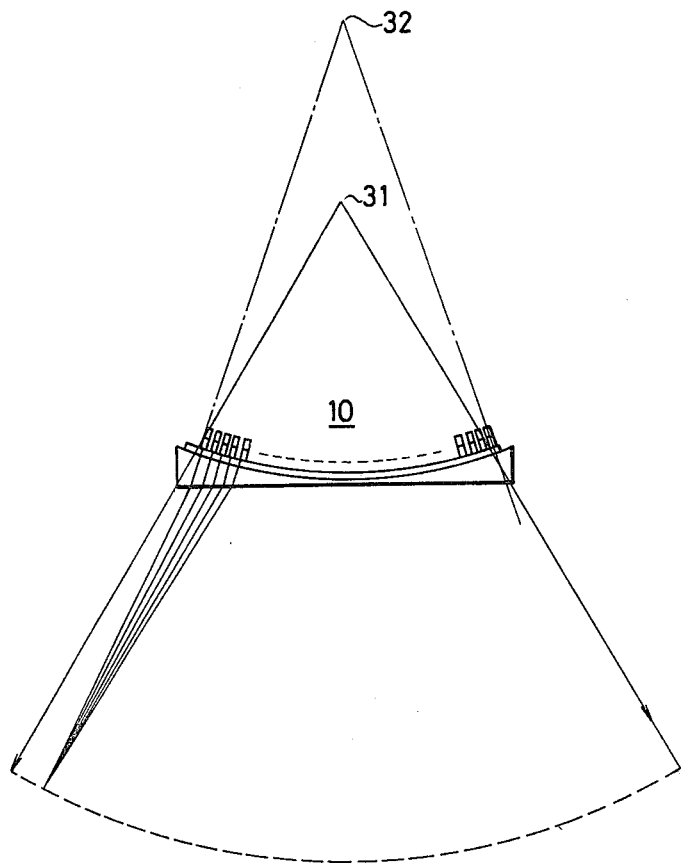
FIG. 5 is a sketch illustrating the diverging beam of acoustic energy transmitted from the array.

According to the present invention, a diverging acoustic lens 30 generally of a plano-concave construction is secured to the common impedance matching layer 24 with its plane surface facing toward the human body to define an entry surface for the generated ultrasonic energy. The acoustic lens 30 is formed of silicone rubber having substantially the same acoustic impedance as the human body but having such an acoustic property that in the lens 30 the acoustic energy propagates at a speed lower than it propagates in the human body. Because of the increase in sound velocity in the human body, the incident ultrasonic beam is deflected in a direction away from the normal to the array 10 as it impinges on the plane entry surface at an angle thereto as illustrated in FIG. 5, and therefore the scanned beam propagates as if it originates from a point 31 closer to the array 10 rather than from a point 32 from which it would originate if the acoustic lens 30 is not provided. The amount of tomographic information available from the arc scan transducer array of the invention is thus greater than that available with conventional linear scan type arrays. The plane entry surface defined by the acoustic lens 30 assures an intimate contact with the human subject, so that acoustic energy encounters no loss upon entry into and return from the human body. It is seen from FIG. 3 that the acoustic lens 30 preferably has a convexed surface as viewed in the longitudinal direction of the array to provide beam focusing in a direction normal to the direction of scan.

Figure 6:
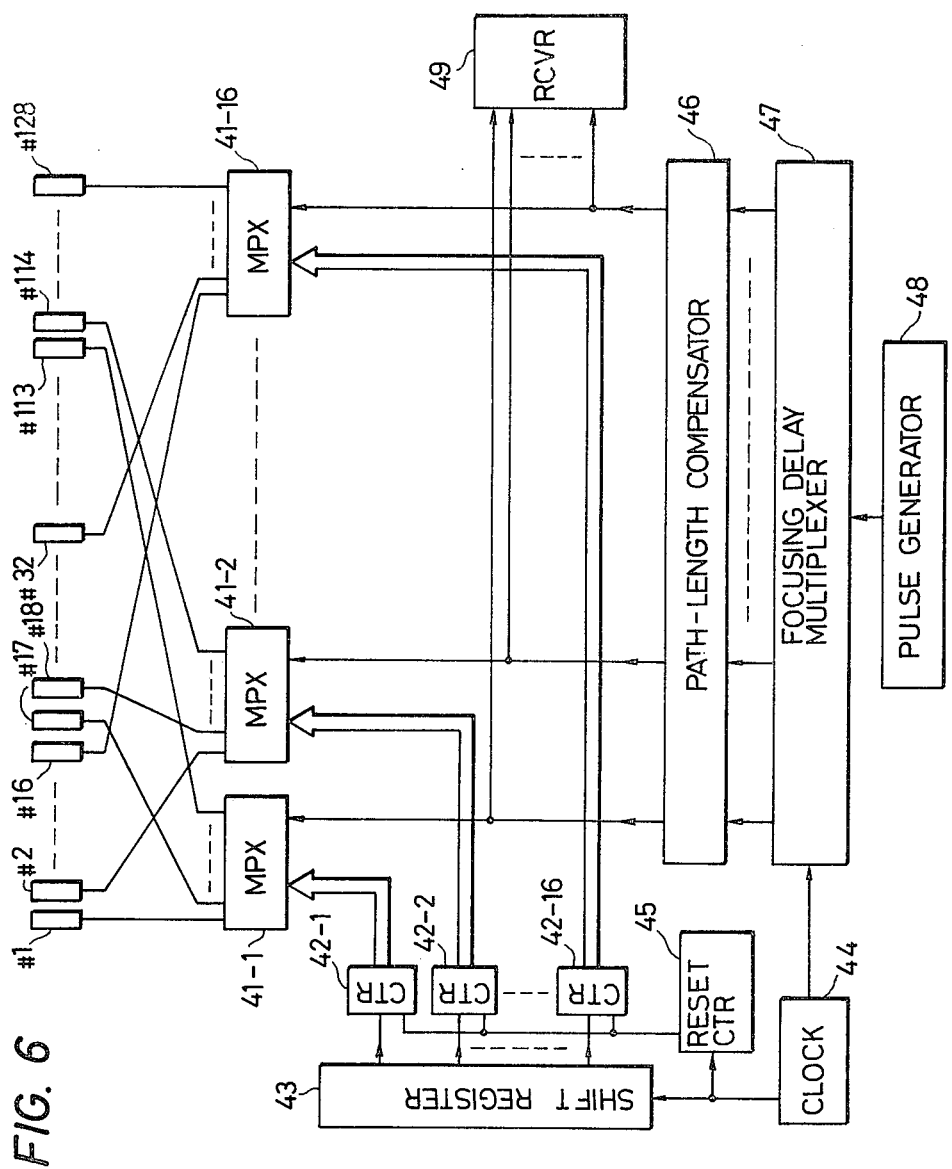
FIG. 6 is an illustration of a steering control circuit for the transducer array of the invention.

FIG. 6 is an illustration of a control circuit for driving the transducer array 10 of the invention. For purposes of illustration analog multiplexers 41-1 through 41-16 are provided for the array 10 which includes transducers #1 through #128. These transducers are divided into 16 subgroups of eight transducers each. Each analog multiplexer 41 is provided with eight output terminals for connection to those transducers which are spaced by sixteen elements, with the corresponding output terminals of the multiplexers being connected respectively to adjacent transducers of each transducer group. For example, the #1 output terminals of multiplexers 41-1 to 41-16 are connected respectively to the #1 to #16 transducers, the #2 output terminals being connected respectively to the #17 to #32 transducers, and the #16 output terminals being connected respectively to the #113 to #128 transducers. Counters 42-1 to 42-16 are connected to the inputs of the multiplexers 41-1 to 41-16 respectively to select one of the eight output terminals of the associated multiplexers in response to output signals supplied individually from a shift register 43 which in turn is connected to receive a clock signal from a clock source 44. The counters 42-1 to 42-16 are counted up in response to every 16th clock pulse and cleared by a reset counter 45 in response to every 128th clock pulse. In response to the #1 clock pulse all the counters are conditioned so that the #1 output terminals of all the multiplexers are activated to couple their inputs to the transducers #1 to #16. This condition is retained for a clock interval such that upon the occurrence of a #2 clock pulse the transducers #2 to #17 are selected. Therefore, a group of 16 successive transducers is shifted to the next by one transducer element in response to each clock pulse.

To the inputs of the muliplexers 41-1 to 41-16 are connected a compensator unit 46 and a receiver unit 49. The compensator unit 46 receives its input signals from a focusing delay multiplexer 47 which essentially comprises a plurality of successively connected variable delay elements. These delay elements introduce a delay interval in succession into a transmit burst signal supplied from a pulse generator 48. The transducers of a given selected group are then energized by successively delayed burst signals so that focused ultrasonic energy is angulated on one side of the normal to the array 10. The amounts of delay are varied in response to the clock pulse from source 44 to successively deflect the transmitted ultrasonic beam on either side of the normal to the array. The amplitude of the delayed burst signals are amplified with different gain by the compensator unit 46 to compensate for the different attenuation of the ultrasonic energy due to different path lengths of the acoustic lens 30, so that the ultrasonic energy is transmitted at a constant strength regardless of steering angles. The connections to the selected transducers from the multiplexers are retained until the occurrence of the next clock pulse to allow echo signals returning from different tissues of the human subject to be received by the same transducers for conversion to electrical signals which are applied to the receiver unit 49. The received echo signals are processed to give a tomographical representation in an arc format on a display unit, not shown.

What is claimed is:

1. An ultrasonic transducer array for transmitting a diverging acoustic beam, comprising:
    a plurality of successively arranged, elongated piezoelectric transducers for generating an acoustic beam from different locations of said array;
    means for supporting said transducers on a generally convex surface so that said beam diverges from a first point located behing the array; and
    an acoustic diverging lens having a first curved surface that is complementary to said convex surface and a second, opposite surface that is generally flat and adapted to contact a body, said complementary curved surface of said lens being attached to said convex surface for diverging said acoustic beam outwardly to cause the acoustic energy transmitted from said transducers to emanate from a second point closer to said array than said first point enabling the array to scan a shallower region of the body than is achieved without said diverging lens.

2. An ultrasonic transducer array as claimed in claim 1, wherein said acoustic diverging lens has a convexed surface as viewed in the longitudinal direction of said array to provide focusing of the acoustic energy in a direction normal to the direction of scan.

3. An ultrasonic transducer array as claimed in claim 1 or 2, wherein said acoustic lens comprises a material having substantially the same acoustic impedance as the acoustic impedance of the human body and having a characteristic such that in said acoustic lens the ultrasonic energy propagates at a speed lower than it propagates in said human body.

4. An ultrasonic transducer array as claimed in claim 1, wherein each of said piezoelectric transducers comprises a piezoelectric element and an impedance matching element which is secured to said piezoelectric element, further comprising an impedance matching layer secured between said impedance matching elements of the transducers and said acoustic diverging lens, said impedance matching layer having a lower acoustic impedance than the acoustic impedance of said impedance matching elements.

5. An ultrasonic transducer array as claimed in claim 4, wherein each of said impedance matching elements and said impedance matching layer have a greater acoustic impedance than the acoustic impedance of the human subject.

6. An ultrasonic diagnostic probe for transmitting a diverging acoustic beam into the body of an animate object, comprising:
    an array of piezoelectric transducers; and an acoustic lens having a concave surface on one side thereof and a generally flat opposite surface which makes contact with said animate object to define an entry surface thereto, wherein said transducers are successively arranged on said concave surface for transmitting acoustic beams from different locations of said array through different paths of said lens, said opposite surface of said lens diverging said beam outwardly on each side of an axis normal to said array at a point of entry to said animate object, thereby enabling the array to scan a shallower region of the animate object than is achieved without said diverging lens.

7. An ultrasonic diagnostic probe as claimed in claim 6, wherein said lens is a plano-concave lens.

8. An ultrasonic diagnostic probe as claimed in claim 6, wherein said opposite surface is convex as viewed in a longitudinal direction of said array to provide a focusing effect on said beam.

9. An ultrasonic diagnostic probe as claimed in claim 6, wherein said acoustic lens comprises a material having substantially the same acoustic impedance as that of said animate object.

10. An ultrasonic diagnostic probe as claimed in claim 6, further comprising a plurality of impedance matching elements each secured to each of said transducers and an impedance matching layer secured between said impedance matching elements and said concave surface of said lens, said impedance matching layer having a lower acoustic impedance than the acoustic impedance of said impedance matching elements.

11. An ultrasonic diagnostic probe as claimed in claim 6, further comprising means for successively energizing each of a plurality of subarrays of said transducers which partially overlap the transducers of adjacent subarrays to generate said acoustic beam.

12. An ultrasonic diagnostic probe as claimed in claim 7, wherein said opposite surface is convex as viewed in a longitudinal direction of said array to provide a focusing effect on said beam.

13. An ultrasonic diagnostic probe as claimed in claim 7, wherein said acoustic lens comprises a material having substantially the same acoustic impedance as that of said animate object.

14. An ultrasonic diagnostic probe as claimed in claim 8, further comprising a plurality of impedance matching elements each secured to each of said transducers and an impedance matching layer secured between said impedance matching elements and said concave surface of said lens, said impedance matching layer having a lower acoustic impedance than the acoustic impedance of said impedance matching elements.

* * * * *